United States Patent Office 2,839,529
Patented June 17, 1958

2,839,529
ISOTHIAZOLE COMPOUNDS

Arthur Adams, Upminster, and Ronald Slack, Chelsea, London, England, assignors to May & Baker Limited, Dagenham, England, a British company No Drawing. Application July 8, 1957
Serial No. 670,360

Claims priority, application Great Britain July 12, 1956

5 Claims. (Cl. 260—239.95)

This invention is for improvements in or relating to heterocyclic compounds and is more particularly concerned with new p-aminobenzenesulphonamido heterocyclic compounds and with processes for their preparation.

It is well known that, of the very large number of p-aminobenzenesulphonamido compounds (including their derivatives) that have been made and tested by various workers for possible antibacterial or other useful therapeutic activity, only a very few have proved to be of sufficient relative merit to justify their use in human or veterinary therapy. Despite intensive research and experimentation over the past decade or so it is still not possible to predict whether a given compound will possess useful antibacterial activity comparable to that of those sulphonamido-heterocyclic compounds that have received wide acceptance by the medical profession such as 2-(p-aminobenzenesulphonamido)thiazole, known also by the generic name sulphathiazole.

In accordance with the present invention, it has now been unexpectedly discovered that the hitherto unknown isothiazole compounds represented by the formula:

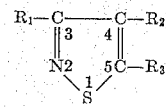

wherein $R_1$ represents a hydrogen atom or a methyl group, one of $R_2$ and $R_3$ is a hydrogen atom and the other is a p-aminobenzenesulphonamido group linked to the isothiazole ring by the sulphonamido nitrogen atom, their salts with, for example alkali metals and alkaline earth metals, and certain $N^4$-acyl derivatives, for example the phthalyl and succinyl derivatives, show antibacterial activity as great as, or greater than, that of sulphathiazole, more specifically against E. coli.

The new compounds may be prepared by methods analogous to those described in the literature for the preparation of $N^1$-heterocyclic derivatives of sulphanilamide. In particular, they may be prepared by the reaction of a p-R-benzenesulphonyl halide (where R is a group (preferably an acylamido group) convertible into a primary amino group) with the appropriate 4- or 5-aminoisothiazole followed by conversion of the group R (e. g. by hydrolysis in the case where R represents an acylamido group) into a primary amino group or a salt or acyl derivative thereof. The reaction may be carried out in the presence of a basic condensing agent and of an organic or aqueous solvent. The solvent and condensing agent may be the same substance, for example, pyridine.

The 4- and 5-aminoisothiazoles which are the intermediates for the products of the present invention are themselves new and may be prepared by methods not in themselves forming part of the present invention but nevertheless illustrated in the examples which follow.

The invention is illustrated by the following examples.

Example I

To an ice-cooled solution of 4(or 5)-aminoisothiazole (12.5 g.) in dry pyridine (125 cc.) was slowly added p-acetamidobenzenesulphonyl chloride (32 g.) below 10° C. After 16 hours the solution was poured into water (4 l.) and after a further two hours the solid product was filtered off, washed with water and dried (37.5 g.). Crystallisation from ethanol gave 4(or 5)-p-acetamidobenzenesulphonamidoisothiazole as small colourless crystals, M. P. 261–262° C.

A solution of 4(or 5)-p-acetamidobenzenesulphonamidoisothiazole (2.1 g.) in 2 N sodium hydroxide (20 cc.) was boiled under reflux for two hours. Charcoal was added, boiling was continued for five minutes and the solution was filtered hot. The pH of the cooled filtrate was adjusted to 4–5 with 2 N hydrochloric acid, and the mixture was refrigerated overnight. The 4(or 5)-p-aminobenzenesulphonamidoisothiazole was filtered off, washed with water, dried (1.7 g.), and recrystallised from ethanol to give colourless needles, M. P. 206° C.

The hydrolysis could be performed equally well with 2 N hydrochloric acid.

The intermediate 4(or 5)-aminoisothiazole is obtained as follows: 5-aminobenz-1:2-isothiazole is oxidised with alkaline potassium permanganate to isothiazole-4:5-dicarboxylic acid (M. P. 145° C. dec.) which, after purification through the sodium salt, is decarboxylated in boiling mesitylene to give isothiazole-4(or 5)-carboxylic acid (M. P. 162° C.). The methyl ester of this acid (M. P. 55° C.), prepared using diazomethane, is heated with hydrazine hydrate in ethanol to give the corresponding carboxyhydrazide (M. P. 176° C. dec.) which is suspended in hydrochloric acid, covered with ether and treated with sodium nitrite at −5° to 0° C. The resulting isothiazole-4(or 5)-carboxyazide (M. P. 32° C.) is heated with benzyl alcohol to give benzyl isothiazole-4(or 5)-urethane (M. P. 101° C.) which, on treatment with hydrogen bromide in acetic acid, gives 4(or 5)-aminoisothiazole hydrobromide. The free base (M. P. 45° C.) is liberated with sodium carbonate, extracted with ether and crystallised from light petroleum.

Example II

Solutions of 5-amino-3-methylisothiazole (20 g.) in pyridine (80 ml.) and of p-acetamidobenzenesulphonyl chloride (46.4 g.) in pyridine (80 ml.) were mixed at a temperature below 20° C. The mixture was then allowed to stand at room temperature for 24 hours and was then poured into a solution of concentrated sulphuric acid (250 ml.) in ice and water (4 kg.), enough free ice being present to keep the final temperature below 10° C. The precipitated solid was filtered off and washed with water. Recrystallisation from glacial acetic acid gave almost colourless lenticular crystals, M. P. 271–273° C. (d.), of 5-p-acetamidobenzenesulphonamido-3-methylisothiazole.

5-p-acetamidobenzenesulphonamido - 3 - methylisothiazole (0.5 g.) was dissolved in 2 N sodium hydroxide solution (10 ml.) and the solution boiled under reflux for 30 minutes. After being cooled in ice, the solution was adjusted to pH 6 by the addition of 2 N hydrochloric acid. The resulting solid was collected at 0° C. and recrystallised from water to give pale yellow needles of 5 - p - aminobenzenesulphonamido - 3 - methylisothiazole, M. P. 191–192° C.

The intermediate 5-amino-3-methyl-isothiazole was obtained in the following manner.

A solution of sodium hydroxide (136 g.) in water (7 l.) was stirred mechanically and cooled to 12° C. by the addition of ice (ca. 500 g.). Powdered potassium persulphate (460 g.) was added and the suspension stirred for 10 minutes. Powdered β-iminothiobutyramide (197 g.) was added in portions during 20 minutes, together with sufficient ice to keep the temperature of the mixture between 12° and 18° C. (ca. 2 kg.). A clear red solution was obtained after about 30 minutes. The solution was stirred for a further 6 hours and allowed to stand overnight. A small amount of impurity was then filtered off and the solution extracted continuously with ether (1 l.) for 24 hours. The extract was dried (Na₂SO₄), cooled in ice and treated with dry hydrogen chloride gas. The precipitated amine hydrochloride was collected immediately, washed with dry ether and dried in a desiccator. The amine hydrochloride (1 part) was dissolved in water (10 parts) and the solution filtered. 50% (w./v.) sodium hydroxide solution (1 vol.) was added and the solution continuously extracted with ether overnight. The extract was dried (Na₂SO₄) and evaporated and the residue distilled in vacuo to give 5-amino-3-methyl-isothiazole as a pale yellow solid, M. P. 52–53° C., B. P. 90–92° C./0.1 mm.

We claim:

1. A member of the class consisting of the isothiazole compounds represented by the formula:

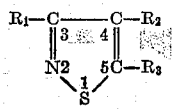

wherein $R_1$ is selected from hydrogen and methyl, one of $R_2$ and $R_3$ is a hydrogen atom and the other is a p-aminobenzenesulphonamido group linked to the isothiazole ring by the sulphonamido nitrogen atom.

2. 4-(p-aminobenzenesulphonamido)isothiazole.
3. 5-(p-aminobenzenesulphonamido)isothiazole.
4. 4-p-(p-aminobenzenesulphonamido) - 3 - methyl-isothiazole.
5. 5-(p-aminobenzenesulphonamido)-3-methyl-isothiazole.

References Cited in the file of this patent

UNITED STATES PATENTS 2,776,970   Lintner _____ Jan. 8, 1957

FOREIGN PATENTS 170,873   Austria _____ Apr. 10, 1952

OTHER REFERENCES

Bambas: "The Chemistry of Nitrogen Heterocyclic Compounds," (1952), Interscience Publishers Ltd., London, pages 223–226.